United States Patent
Yu et al.

(10) Patent No.: US 12,059,947 B2
(45) Date of Patent: Aug. 13, 2024

(54) MOBILE OBJECT WITH WHEELS FOR ADJUSTING TO GROUND SURFACE

(71) Applicants: Hyundai Motor Company, Seoul (KR); Kia Corporation, Seoul (KR)

(72) Inventors: Geun Sang Yu, Chungcheongnam-do (KR); Hun Keon Ko, Gyeonggi-do (KR); Joo Young Chun, Seoul (KR); Eun Ho Seo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 528 days.

(21) Appl. No.: 17/526,133

(22) Filed: Nov. 15, 2021

(65) Prior Publication Data
US 2022/0266669 A1    Aug. 25, 2022

(30) Foreign Application Priority Data
Feb. 24, 2021    (KR) .......................... 10-2021-0025056

(51) Int. Cl.
*B60K 1/02*    (2006.01)
*B62D 5/04*    (2006.01)

(52) U.S. Cl.
CPC ............. *B60K 1/02* (2013.01); *B62D 5/0418* (2013.01)

(58) Field of Classification Search
CPC ...... B60K 1/02; B60K 7/0007; B60K 17/356; B60K 2007/003; B60K 2007/0061; B60K 2007/0092; B60G 17/0157; B60G 2500/32; B62D 5/0418; B60Y 2200/91
USPC ......................................................... 180/237
See application file for complete search history.

(56) References Cited

U.S. PATENT DOCUMENTS 7,426,970 B2    9/2008    Olsen

FOREIGN PATENT DOCUMENTS

| JP | H11-155322 | A | 6/1999 | |
| JP | 2009-173133 | A | 8/2009 | |
| JP | 4737408 | B2 * | 8/2011 | ............ B60G 11/00 |
| JP | 4737408 | B2 | 8/2011 | |

* cited by examiner

*Primary Examiner* — Kevin Hurley
*Assistant Examiner* — Felicia L. Brittman-Alabi
(74) *Attorney, Agent, or Firm* — Fox Rothschild LLP (57) ABSTRACT

A mobile object includes drive parts each having one side coupled to each wheel, in which the drive part includes: a first motor including a first rotary shaft and configured to rotate a respective one of the wheels about the first rotary shaft; a second motor including a second rotary shaft spaced apart from the first rotary shaft in a radial direction of the respective one of the wheels, the second motor being configured to rotate the respective one of the wheels about the second rotary shaft; and a third motor including a third rotary shaft extending in a direction intersecting the first rotary shaft and the second rotary shaft, the third motor being configured to steer the respective one of the wheels about the third rotary shaft.

20 Claims, 9 Drawing Sheets

MOBILE OBJECT WITH WHEELS FOR ADJUSTING TO GROUND SURFACE

CROSS-REFERENCE TO RELATED APPLICATION

This application claims under 35 U.S.C. § 119(a) the benefit of Korean Patent Application No. 10-2021-0025056 filed in the Korean Intellectual Property Office on Feb. 24, 2021, the entire contents of which are incorporated herein by reference.

BACKGROUND

(a) Technical Field

The present disclosure relates to a mobile object, more particularly, to the mobile object including wheels configured to adjust to changes in a ground surface.

(b) Description of the Related Art

The technology paradigm is shifting from vehicles using internal combustion engines as power sources to electric vehicles using electric motors as power sources. Further, there is an increasing demand for mobility vehicles mounted with autonomous driving functions. Therefore, research is being actively conducted on mobility vehicles using electric motors as power sources.

Mobility vehicles can be used in various fields. For example, the mobility vehicles may be used not only to transport people, but also to deliver goods.

In the related art, however, there is a limitation in moving a mobility vehicle according to an environment, in particular, a ground surface on which the mobility vehicle travels, and this limitation may be hindering development of the mobility vehicle.

SUMMARY

The present disclosure provides a mobility vehicle having various degrees of freedom in comparison with the related art, enabling the mobility vehicle to adjust to changes in external factors such as an environment, in particular, a ground surface.

In one aspect, the present disclosure provides a mobile object including: wheels; drive parts each having one side coupled to each of the wheels; and a body part to which one side of each of the drive parts is coupled, in which the drive part includes: a first motor including a first rotary shaft and configured to rotate the respective one of the wheels about the first rotary shaft; a second motor including a second rotary shaft spaced apart from the first rotary shaft in a radial direction of the respective one of the wheels, the second motor being configured to rotate the respective one of the wheels about the second rotary shaft; and a third motor including a third rotary shaft extending in a direction intersecting the first rotary shaft and the second rotary shaft, the third motor being configured to steer the respective one of the wheels about the third rotary shaft.

The wheels may include: a first wheel provided at a front-right side of the body part; a second wheel provided at a front-left side of the body part; a third wheel provided at a rear-right side of the body part; and a fourth wheel provided at a rear-left side of the body part, and the drive parts may include: a first drive part coupled to the first wheel; a second drive part coupled to the second wheel; a third drive part coupled to the third wheel; and a fourth drive part coupled to the fourth wheel.

The first wheel and the third wheel may be spaced apart from each other at any rotation angles of the second rotary shafts provided on the first and third wheels.

The second wheel and the fourth wheel may be spaced apart from each other at any rotation angles of the second rotary shafts provided on the second and fourth wheels.

The second motor provided in the first drive part and the second motor provided in the third drive part may operate so that the first wheel and the third wheel are respectively positioned at lowermost ends with respect to the body part, and the second motor provided in the second drive part and the second motor provided in the fourth drive part may operate so that the second wheel and the fourth wheel are respectively positioned at uppermost ends with respect to the body part.

The second motor provided in the first drive part and the second motor provided in the second drive part may operate so that the first wheel and the second wheel are respectively positioned at foremost sides with respect to the body part, and the second motor provided in the third drive part and the second motor provided in the fourth drive part may operate so that the third wheel and the fourth wheel are respectively positioned at rearmost sides with respect to the body part.

The second motor provided in the first drive part and the second motor provided in the second drive part may operate so that the first wheel and the second wheel are respectively positioned at rearmost sides with respect to the body part, and the second motor provided in the third drive part and the second motor provided in the fourth drive part may operate so that the third wheel and the fourth wheel are respectively positioned at foremost sides with respect to the body part.

The first rotary shaft may be disposed at a center in the radial direction of the respective one of the wheels, and the first motor may rotate the respective one of the wheels about the first rotary shaft.

The second motor may rotate the respective one of the wheels about the second rotary shaft.

The first rotary shaft and the second rotary shaft may be provided in parallel with each other.

A distance between the first rotary shaft and the second rotary shaft may be smaller than a radius of the respective one of the wheels.

The third rotary shaft may be provided to be perpendicular to the first rotary shaft and the second rotary shaft.

An extension line of the first rotary shaft and an extension line of the third rotary shaft may be orthogonal to each other when the second rotary shaft has a predetermined rotation angle.

An extension line of the second rotary shaft and an extension line of the third rotary shaft may be orthogonal to each other.

Each of the wheels may include: an outer section including an outer peripheral surface in the radial direction of the respective one of the wheels; an inner section provided inward in the radial direction from the outer section; and a connection section provided between the inner section and the outer section and configured to connect the outer section and the inner section, and in which the second motor is provided to face the connection section.

A portion of the connection section, which faces the second motor, may be recessed outward from the outer section and the inner section.

The third motor may steer the respective one of the wheels by rotating the second rotary shaft about the third rotary shaft by operating the third rotary shaft.

The mobile object may further include an extension part protruding from the connection section toward the second motor, the second rotary shaft may be inserted into the extension part, and the third rotary shaft may be coupled to the extension part.

The extension part may include: an extension body protruding from the respective one of the wheels toward the body part and having one side coupled to the respective one of the wheels; and an extension plate protruding from an upper surface of the extension body toward the body part, and in which the third rotary shaft is inserted into the extension plate.

A bottom surface of the body part may be positioned above a bottom surface of the respective one of the wheels at any rotation angle of the second rotary shaft.

According to the present disclosure, it is possible to provide the mobility vehicle having the novel structure that may have various degrees of freedom in comparison with the related art, thereby adjusting to a change in external factors such as an environment, in particular, a ground surface.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a mobile object according to the present disclosure will be described with reference to the drawings.

Figure 1:
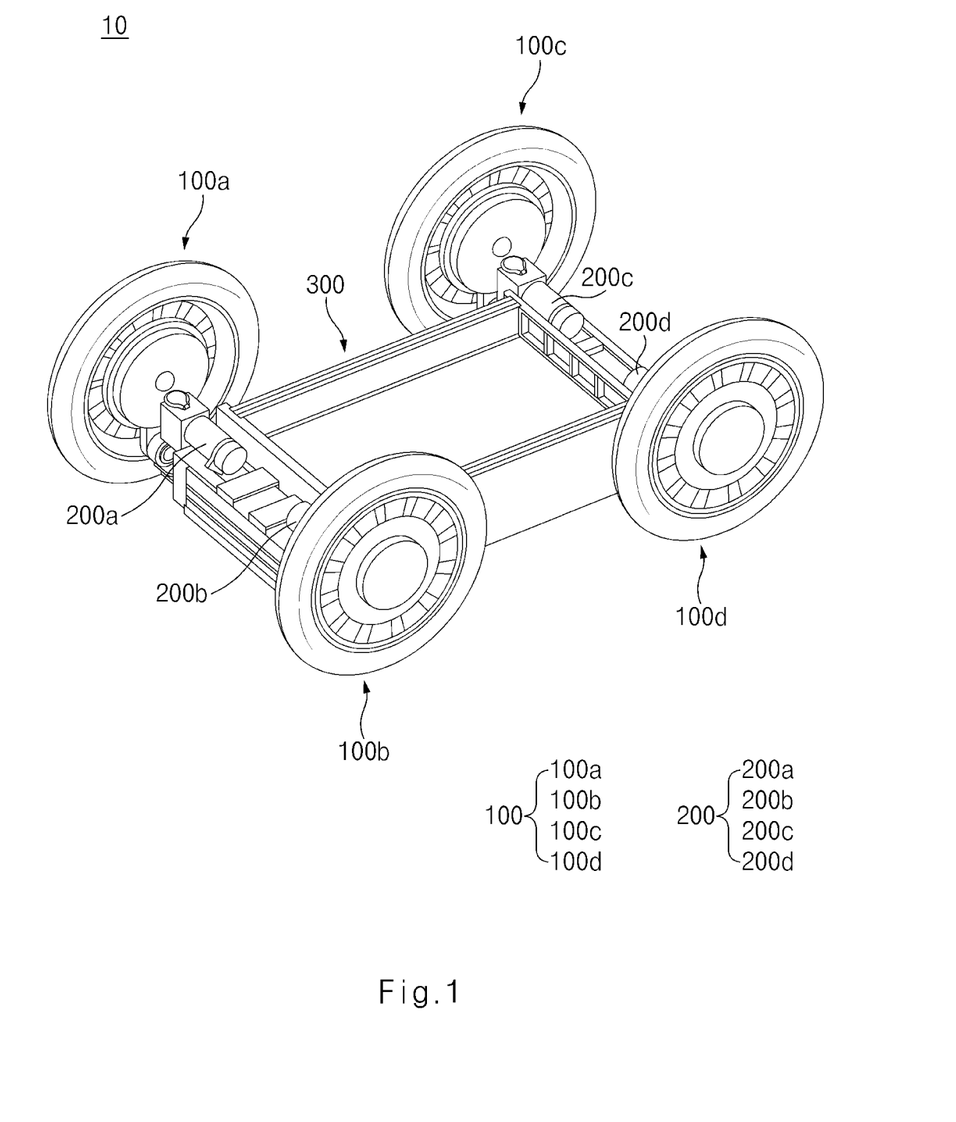
FIG. 1 is a perspective view illustrating a structure of a mobile object according to the present disclosure.
Figure 2:
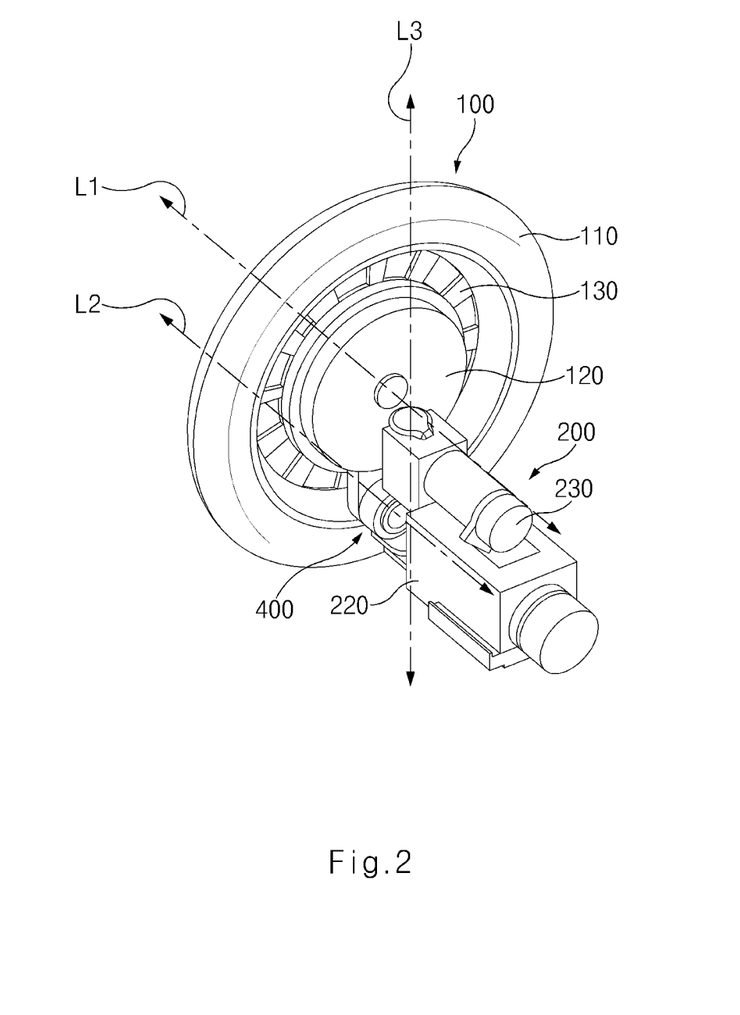
FIG. 2 is a perspective view illustrating a coupling structure between a wheel and a drive part provided in the mobile object according to the present disclosure.
Figure 3:
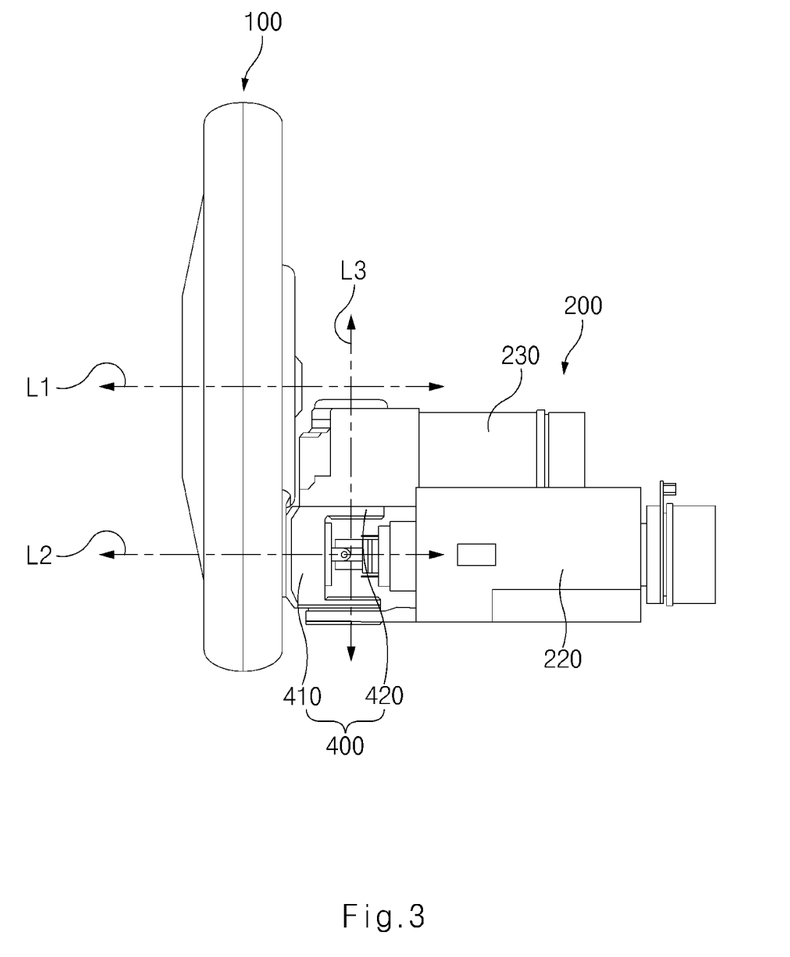
FIG. 3 is a front view illustrating the coupling structure between the wheel and the drive part provided in the mobile object according to the present disclosure.

FIG. 1 is a perspective view illustrating a structure of a mobile object according to the present disclosure, and FIG. 2 is a perspective view illustrating a coupling structure between a wheel and a drive part provided in the mobile object according to the present disclosure. FIG. 3 is a front view illustrating the coupling structure between the wheel and the drive part provided in the mobile object according to the present disclosure.

Referring to FIGS. 1 to 3, a mobile object 10 according to the present disclosure may include wheels 100, drive parts 200 each having one side coupled to the wheel 100, and a body part 300 to which one side of each of the drive parts 200 is coupled. According to the present disclosure, the mobile object 10 may be moved by the rotational motions of the wheels 100. The drive parts 200 may provide power for rotating the wheels 100. Furthermore, as described below, according to the present disclosure, the drive parts 200 may provide power for allowing the mobile object 10 to have various postures.

In addition, according to the present disclosure, the mobile object 10 may have a plurality of wheels 100 and a plurality of drive parts 200. For example, as illustrated in FIG. 1, the wheels 100 may include a first wheel 100a provided at a front-right side of the body part 300, a second wheel 100b provided at a front-left side of the body part 300, a third wheel 100c provided at a rear-right side of the body part 300, and a fourth wheel 100d provided at a rear-left side of the body part 300.

In addition, the drive parts 200 may include a first drive part 200a having one side coupled to the first wheel 100a and the other side coupled to the body part 300, a second drive part 200b having one side coupled to the second wheel 100b and the other side coupled to the body part 300, a third drive part 200c having one side coupled to the third wheel 100c and the other side coupled to the body part 300, and a fourth drive part 200d having one side coupled to the fourth wheel 100d and the other side coupled to the body part 300.

Meanwhile, according to the present disclosure, each of the drive parts 200 may include a plurality of motors that performs different functions. In particular, each of the drive parts 200 may include: a first motor (not illustrated) including a first rotary shaft and configured to rotate the wheel 100 about the first rotary shaft; a second motor 220 including a second rotary shaft spaced apart from the first rotary shaft in a radial direction of the wheel 100 and configured to rotate the wheel 100 about the second rotary shaft; and a third motor 230 including a third rotary shaft extending in a direction intersecting the first rotary shaft and the second rotary shaft and configured to steer the wheel 100 about the third rotary shaft. Because the first to third rotary shafts are provided inside the first to third motors, respectively, FIGS. 1 to 3 do not clearly illustrate the first to third rotary shafts. However, FIGS. 2 and 3 illustrate a first extension line L1 which is an imaginary extension line extending from the first rotary shaft, a second extension line L2 which is an imaginary extension line extending from the second rotary shaft, and a third extension line L3 which is an imaginary extension line extending from the third rotary shaft. Hereinafter, in the present specification, the first to third rotary shafts will be described with reference to the first to third extension lines L1, L2, and L3.

In particular, referring to FIGS. 2 and 3, the first rotary shaft may be disposed at a center in a radial direction of the wheel 100. Therefore, according to the present disclosure, the first motor may rotate the wheel 100 about the first rotary shaft. For example, the first motor may be an in-wheel motor disposed inside the wheel 100. FIGS. 2 and 3 illustrate that the first extension line L1 penetrates the center in the radial direction of the wheel 100.

For example, referring to FIGS. 2 and 3, the wheel 100 may include: an outer section 110 including an outer peripheral surface in the radial direction of the wheel 100; an inner section 120 provided inward in the radial direction from the outer section 110; and a connection section 130 provided between the inner section 120 and the outer section 110 and configured to connect the outer section 110 and the inner section 120. In this case, the second motor 220 may be provided to face the connection section 130. In addition, when the first motor is an in-wheel motor, the first motor may be provided in an internal space of the inner section 120. In more detail, when the first motor operates, the outer section 110 and the connection section 130 of the wheel 100 rotate about the first rotary shaft, while the inner section 120 of the wheel 100 does not rotate and is fixed.

Meanwhile, as illustrated in FIGS. 2 and 3, a portion of the connection section 130, which faces the second motor 220, may have a shape recessed outward from the outer section 110 and the inner section 120. In this case, an interval between the wheel 100 and the body part 300 may be minimized.

As described above, the second rotary shaft may be spaced apart from the first rotary shaft in the radial direction of the wheel 100. Therefore, according to the present disclosure, the second motor 220 may rotate the wheel 100 about the second rotary shaft by operating the second rotary shaft. The second motors 220 provided in the mobile object 10 according to the present disclosure may change the posture of the mobile object 10 by changing the positions of the wheels 100 relative to the body part 300. More particularly, the first rotary shaft and the second rotary shaft may be parallel to each other. FIGS. 2 and 3 illustrate that the first extension line L1 and the second extension line L2 are spaced apart from each other in parallel. In addition, according to the present disclosure, a distance between the first rotary shaft and the second rotary shaft may be smaller than a radius of the wheel 100. FIGS. 2 and 3 illustrate that a distance between the first extension line L1 and the second extension line L2 is smaller than the radius of the wheel 100.

Meanwhile, as described above, the third rotary shaft may intersect the first rotary shaft and the second rotary shaft. More particularly, the third rotary shaft may be provided to be perpendicular to the first rotary shaft and the second rotary shaft. FIGS. 2 and 3 illustrate that the third extension line L3 is perpendicular to the first extension line L1 and the second extension line L2.

In addition, according to the present disclosure, the second extension line L2, which is the extension line of the second rotary shaft, may be orthogonal to the third extension line L3 which is the extension line of the third rotary shaft. In addition, according to the present disclosure, when the second rotary shaft has a predetermined rotation angle, the first extension line L1, which is the extension line of the first rotary shaft, may be orthogonal to the third extension line L3 which is the extension line of the third rotary shaft. FIGS. 2 and 3 illustrate that the second extension line L2 and the third extension line L3 are orthogonal to each other in a state in which the second rotary shaft is rotated so that the second motor 220 is positioned at a lowermost end with respect to the wheel 100. Similarly, according to the present disclosure, the second extension line L2 and the third extension line L3 may be orthogonal to each other in a state in which the second rotary shaft is rotated so that the second motor 220 is positioned at an uppermost end with respect to the wheel 100.

Meanwhile, the mobile object 10 according to the present disclosure may further include extension parts 400 each protruding from the connection section 130 toward the second motor 220, and the second rotary shaft is inserted into the extension part 400. In this case, the third rotary shaft may be coupled to the extension part 400.

In particular, as illustrated in FIGS. 1 to 3, the extension part 400 may include: an extension body 410 protruding from the wheel 100 toward the body part 300 and having one side fixedly coupled to the inner section 120 of the wheel 100; and an extension plate 420 protruding from an upper surface of the extension body 410 toward the body part 300 and coupled to the third rotary shaft, and the third rotary shaft is inserted into the extension plate 420. For example, the second rotary shaft may be coupled to an outer portion of the extension body 410. Therefore, when the second rotary shaft is operated by the second motor 220, the extension body 410 may also rotate together with the second rotary shaft. However, alternatively, a vacant space may be provided in the extension body 410, and at least a part of the second rotary shaft may be inserted into the extension body 410.

Therefore, according to the present disclosure, the third motor 230 may steer the wheel 100 by operating the third rotary shaft. That is, when the third rotary shaft is rotated by the third motor 230, the extension plate 420 into which the third rotary shaft is inserted and coupled may rotate in a horizontal direction. Therefore, the extension body 410 and the second rotary shaft may also rotate, and the wheel 100 may be steered in the horizontal direction.

Meanwhile, according to the present disclosure, in the case in which the second rotary shaft is fixedly coupled to the extension body 410, the second rotary shaft may rotate together with the extension body 410 when the second rotary shaft is rotated by the second motor 220. However, the second rotary shaft may be coupled to be rotatable in the horizontal direction relative to the extension body 410 regardless of the configuration in which the second rotary shaft is rotated by the second motor 220 and the extension body 410 rotates together with the second rotary shaft. To this end, a predetermined joint structure may be provided between the second rotary shaft and the extension body 410 so that the second rotary shaft and the extension body 410 may rotate in the horizontal direction relative to each other.

Figure 4:
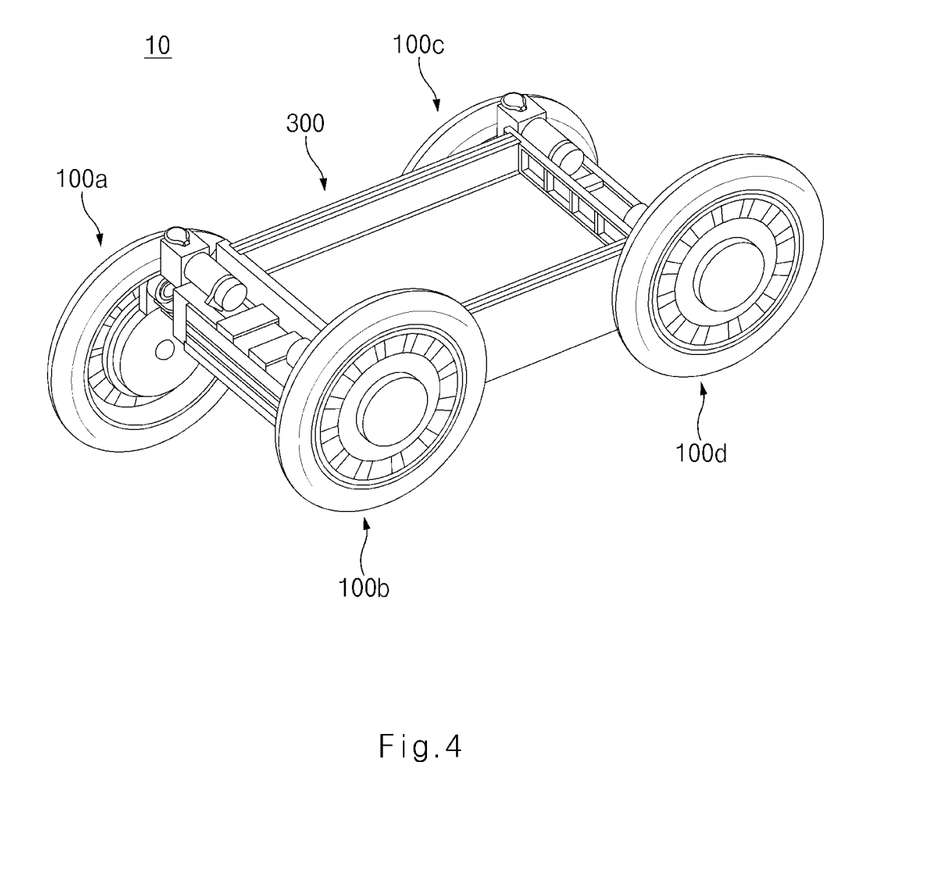
FIG. 4 is a perspective view illustrating a first operational example of the mobile object according to the present disclosure.
Figure 5:
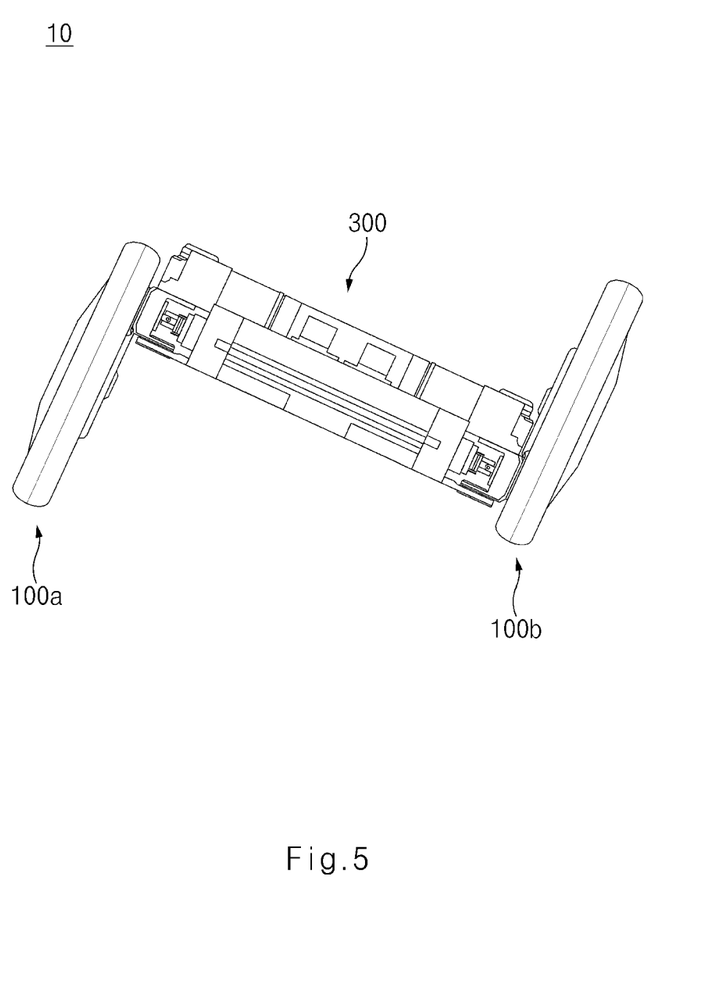
FIG. 5 is a front view illustrating the first operational example of the mobile object according to the present disclosure.
Figure 6:
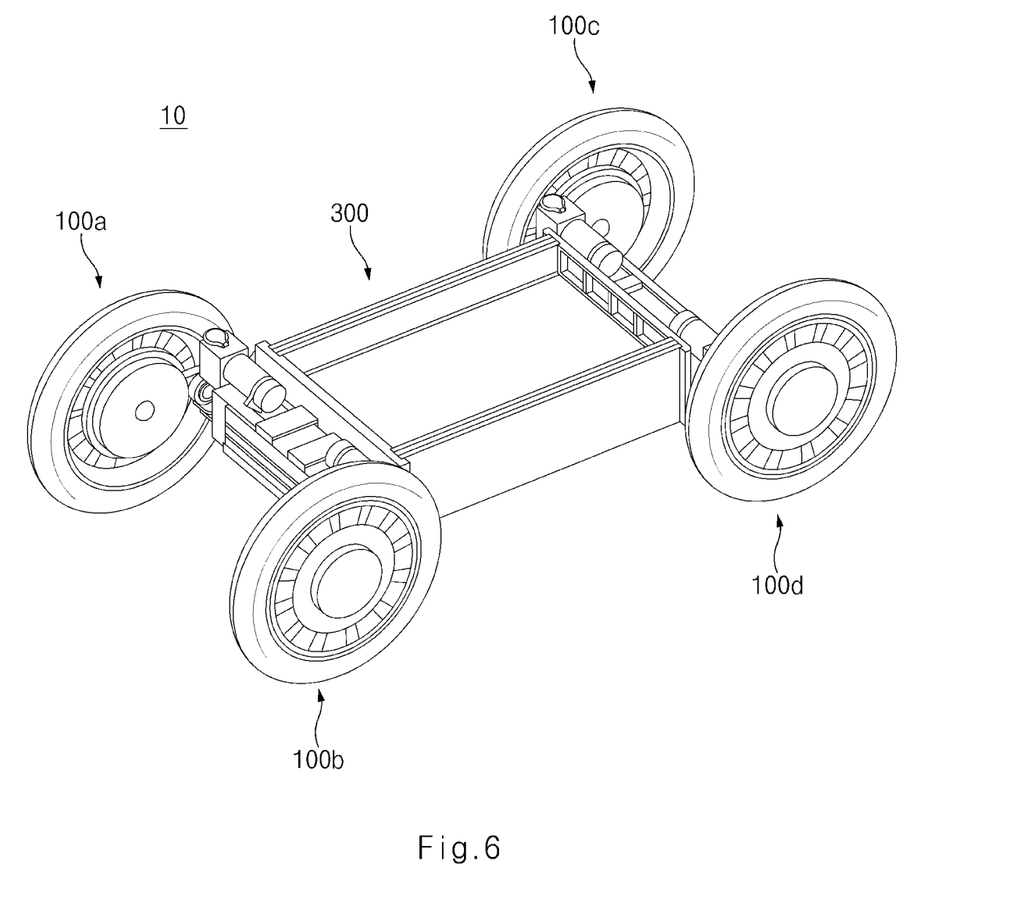
FIG. 6 is a perspective view illustrating a second operational example of the mobile object according to the present disclosure.
Figure 7:
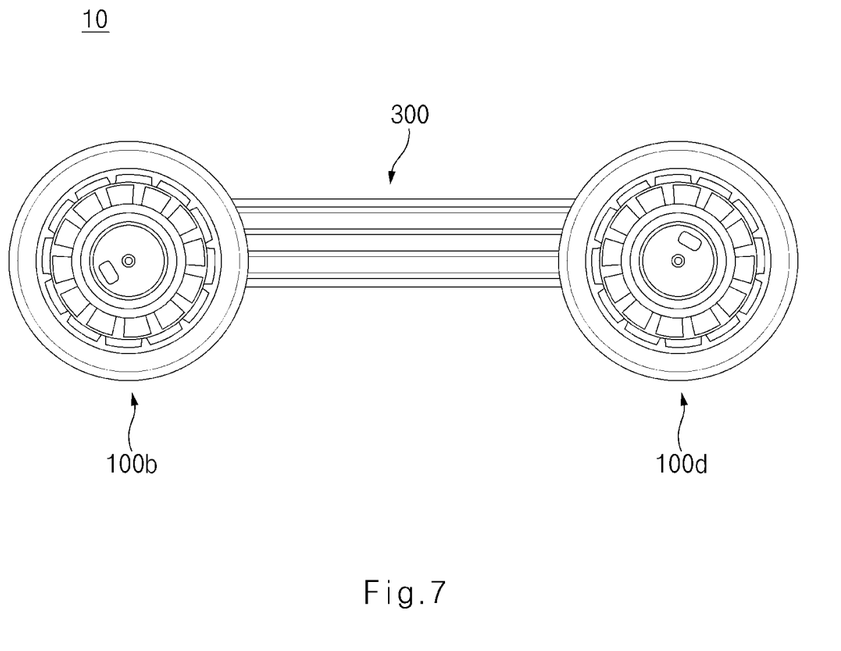
FIG. 7 is a side view illustrating the second operational example of the mobile object according to the present disclosure.
Figure 8:
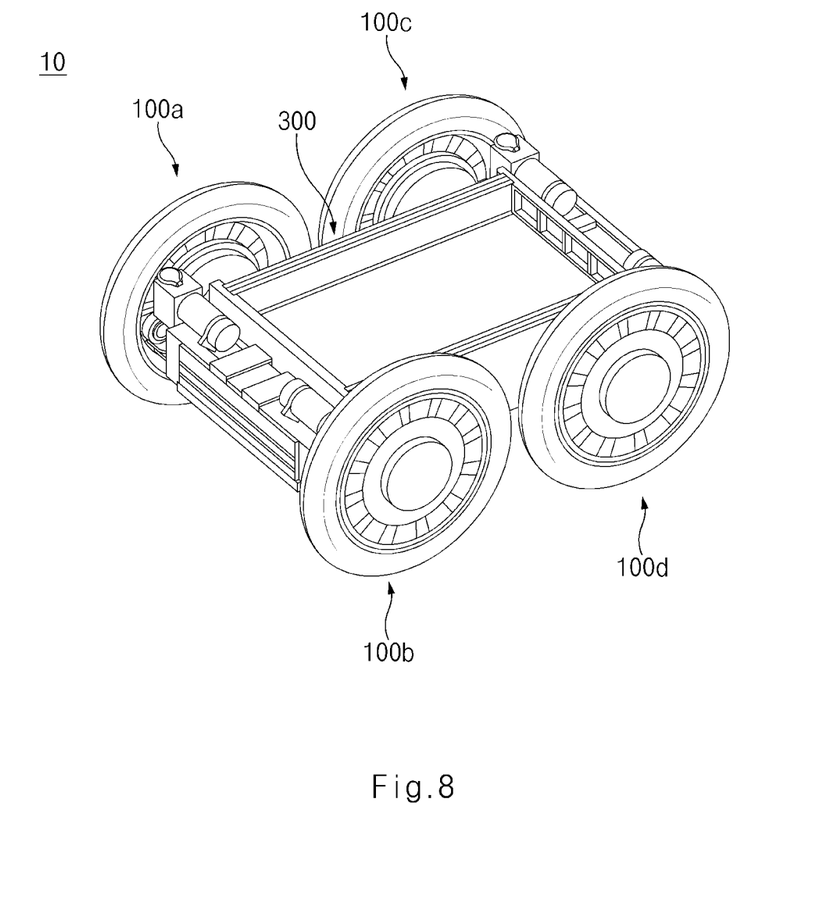
FIG. 8 is a perspective view illustrating a third operational example of the mobile object according to the present disclosure.
Figure 9:
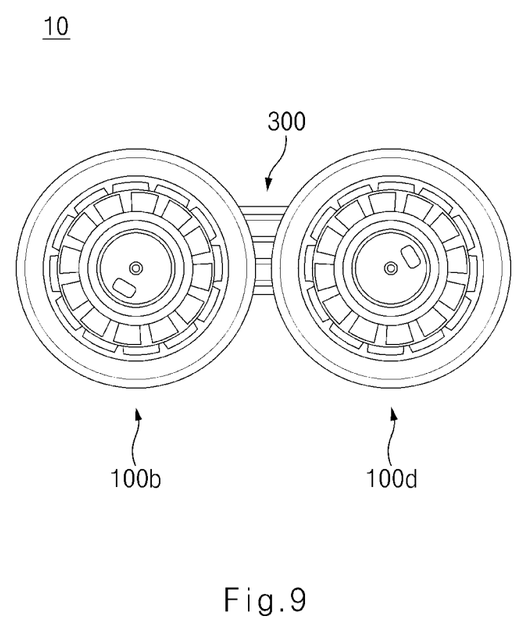
FIG. 9 is a side view illustrating the third operational example of the mobile object according to the present disclosure.

FIG. 4 is a perspective view illustrating a first operational example of the mobile object according to the present disclosure, and FIG. 5 is a front view illustrating the first operational example of the mobile object according to the present disclosure. In addition, FIG. 6 is a perspective view illustrating a second operational example of the mobile object according to the present disclosure, and FIG. 7 is a side view illustrating the second operational example of the mobile object according to the present disclosure. In addition, FIG. 8 is a perspective view illustrating a third operational example of the mobile object according to the present disclosure, and FIG. 9 is a side view illustrating the third operational example of the mobile object according to the present disclosure.

As illustrated in FIGS. 4 to 9, the mobile object 10 according to the present disclosure may implement various postures and thus flexibly adjust to a change in ground surface on which the mobile object 10 travels.

That is, as the first operational example, the mobile object 10 may implement a posture illustrated in FIGS. 4 and 5 when the second motors 220 operate so that the first wheel 100a and the third wheel 100c are positioned at the lowermost ends with respect to the body part 300 and the second wheel 100b and the fourth wheel 100d are positioned at the uppermost ends with respect to the body part 300.

In particular, referring to FIGS. 1, 2, 4, and 5, in the first operational example, the second motor provided in the first drive part 200a and the second motor provided in the third drive part 200c may operate so that the first wheel 100a and the third wheel 100c are respectively positioned at the lowermost ends with respect to the body part 300. Further, the second motor provided in the second drive part 200b and the second motor provided in the fourth drive part 200d may operate so that the second wheel 100b and the fourth wheel 100d are respectively positioned at the uppermost ends with respect to the body part 300.

In addition, as the second operational example, the mobile object 10 may implement a posture illustrated in FIGS. 6 and 7 when the second motors 220 operate so that the first wheel 100a and the third wheel 100c are positioned farthest from each other and the second wheel 100b and the fourth wheel 100d are positioned farthest from each other.

In particular, referring to FIGS. 1, 2, 6, and 7, in the second operational example, the second motor provided in the first drive part 200a and the second motor provided in the second drive part 200b may operate so that the first wheel 100a and the second wheel 100b are respectively positioned at the foremost sides with respect to the body part 300. Further, the second motor provided in the third drive part 200c and the second motor provided in the fourth drive part 200d may operate so that the third wheel 100c and the fourth wheel 100d are respectively positioned at the rearmost sides with respect to the body part 300.

In addition, as the third operational example, the mobile object 10 may implement a posture illustrated in FIGS. 8 and 9 when the second motors 220 operate so that the first wheel 100a and the third wheel 100c are positioned closest to each other and the second wheel 100b and the fourth wheel 100d are positioned closest to each other. In particular, referring to FIGS. 1, 2, 8, and 9, in the third operational example, the second motor provided in the first drive part 200a and the second motor provided in the second drive part 200b may operate so that the first wheel 100a and the second wheel 100b are respectively positioned at the rearmost sides with respect to the body part 300. Further, the second motor provided in the third drive part 200c and the second motor provided in the fourth drive part 200d may operate so that the third wheel 100c and the fourth wheel 100d are respectively positioned at the foremost sides with respect to the body part 300.

Meanwhile, in the mobile object 10 according to the present disclosure, as illustrated in FIGS. 4 and 5, a bottom surface of the body part 300 may be positioned above bottom surfaces of the wheels 100 at any rotation angles of the second rotary shafts according to the present disclosure so that the second wheel 100b and the fourth wheel 100d may be positioned at the lowermost ends with respect to the body part 300. This configuration may mean that the radius of the wheel 100 is sufficiently larger than a height of the body part 300 in the vertical direction.

In addition, the first wheel 100a and the third wheel 100c may be spaced apart from each other at any rotation angles of the second rotary shafts provided on the first and third wheels 100a and 100c, and the second wheel 100b and the fourth wheel 100d may be spaced apart from each other at any rotation angles of the second rotary shafts provided on the second and fourth wheels 100b and 100d, such that the mobile object 10 according to the present disclosure may have the posture illustrated in FIGS. 8 and 9. This configuration may mean that an interval between the first wheel 100a and the third wheel 100c and an interval between the second wheel 100b and the fourth wheel 100d are sufficiently larger than a length of the body part 300 in a forward/rearward direction.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A mobile object comprising:
   wheels;
   drive parts each having one side coupled to each of the wheels; and
   a body part to which the one side of each of the drive parts is coupled,
   wherein each of the drive parts comprises:
   a first motor comprising a first rotary shaft and configured to rotate a respective one of the wheels about the first rotary shaft;
   a second motor comprising a second rotary shaft spaced apart from the first rotary shaft in a radial direction of the respective one of the wheels, the second motor being configured to rotate the respective one of the wheels about the second rotary shaft; and
   a third motor comprising a third rotary shaft extending in a direction intersecting the first rotary shaft and the second rotary shaft, the third motor being configured to steer the respective one of the wheels about the third rotary shaft.

2. The mobile object of claim 1, wherein the wheels comprise:
a first wheel provided at a front-right side of the body part;
a second wheel provided at a front-left side of the body part;
a third wheel provided at a rear-right side of the body part; and
a fourth wheel provided at a rear-left side of the body part, and
wherein the drive parts comprise:
a first drive part coupled to the first wheel;
a second drive part coupled to the second wheel;
a third drive part coupled to the third wheel; and
a fourth drive part coupled to the fourth wheel.

3. The mobile object of claim 2, wherein the first wheel and the third wheel are spaced apart from each other at any rotation angles of the second rotary shafts provided on the first and third wheels.

4. The mobile object of claim 2, wherein the second wheel and the fourth wheel are spaced apart from each other at any rotation angles of the second rotary shafts provided on the second and fourth wheels.

5. The mobile object of claim 2, wherein the second motor provided in the first drive part and the second motor provided in the third drive part operate so that the first wheel and the third wheel are respectively positioned at lowermost ends with respect to the body part, and
wherein the second motor provided in the second drive part and the second motor provided in the fourth drive part operate so that the second wheel and the fourth wheel are respectively positioned at uppermost ends with respect to the body part.

6. The mobile object of claim 2, wherein the second motor provided in the first drive part and the second motor provided in the second drive part operate so that the first wheel and the second wheel are respectively positioned at foremost sides with respect to the body part, and
wherein the second motor provided in the third drive part and the second motor provided in the fourth drive part operate so that the third wheel and the fourth wheel are respectively positioned at rearmost sides with respect to the body part.

7. The mobile object of claim 2, wherein the second motor provided in the first drive part and the second motor provided in the second drive part operate so that the first wheel and the second wheel are respectively positioned at rearmost sides with respect to the body part, and
wherein the second motor provided in the third drive part and the second motor provided in the fourth drive part operate so that the third wheel and the fourth wheel are respectively positioned at foremost sides with respect to the body part.

8. The mobile object of claim 1, wherein the first rotary shaft is disposed at a center in the radial direction of the respective one of the wheels, and the first motor rotates the respective one of the wheels about the first rotary shaft.

9. The mobile object of claim 1, wherein the second motor rotates the respective one of the wheels about the second rotary shaft.

10. The mobile object of claim 9, wherein the first rotary shaft and the second rotary shaft are provided in parallel with each other.

11. The mobile object of claim 1, wherein a distance between the first rotary shaft and the second rotary shaft is smaller than a radius of the respective one of the wheels.

12. The mobile object of claim 1, wherein the third rotary shaft is provided to be perpendicular to the first rotary shaft and the second rotary shaft.

13. The mobile object of claim 1, wherein an extension line of the first rotary shaft and an extension line of the third rotary shaft are orthogonal to each other when the second rotary shaft has a predetermined rotation angle.

14. The mobile object of claim 1, wherein an extension line of the second rotary shaft and an extension line of the third rotary shaft are orthogonal to each other.

15. The mobile object of claim 1, wherein each of the wheels comprises:
an outer section comprising an outer peripheral surface in the radial direction of the respective one of the wheels;
an inner section provided inward in the radial direction from the outer section; and
a connection section provided between the inner section and the outer section and configured to connect the outer section and the inner section, and
wherein the second motor is provided to face the connection section.

16. The mobile object of claim 15, wherein a portion of the connection section, which faces the second motor, is recessed outward from the outer section and the inner section.

17. The mobile object of claim 15, wherein the third motor steers the respective one of the wheels by rotating the second rotary shaft about the third rotary shaft by operating the third rotary shaft.

18. The mobile object of claim 17, further comprising:
an extension part protruding from the connection section toward the second motor,
wherein the second rotary shaft is inserted into the extension part, and the third rotary shaft is coupled to the extension part.

19. The mobile object of claim 18, wherein the extension part comprises:
an extension body protruding from the respective one of the wheels toward the body part and having one side coupled to the respective one of the wheels; and
an extension plate protruding from an upper surface of the extension body toward the body part, and
wherein the third rotary shaft is inserted into the extension plate.

20. The mobile object of claim 1, wherein a bottom surface of the body part is positioned above a bottom surface of the respective one of the wheels at any rotation angle of the second rotary shaft.

* * * * *